(12) United States Patent
Sundholm

(10) Patent No.: US 11,386,814 B2
(45) Date of Patent: Jul. 12, 2022

(54) ELECTRONIC PRICE LABEL AND ELECTRONIC PRICE LABEL SYSTEM

(71) Applicant: MariElla Labels Oy, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 359 days.

(21) Appl. No.: 16/491,689

(22) PCT Filed: Mar. 6, 2018

(86) PCT No.: PCT/FI2018/050164
§ 371 (c)(1),
(2) Date: Sep. 6, 2019

(87) PCT Pub. No.: WO2018/162799
PCT Pub. Date: Sep. 13, 2018

(65) Prior Publication Data
US 2021/0280092 A1    Sep. 9, 2021

(30) Foreign Application Priority Data
Mar. 7, 2017   (FI) ..................... 20175209

(51) Int. Cl.
*G09F 3/20*       (2006.01)
*G08B 13/06*      (2006.01)
(Continued)

(52) U.S. Cl.
CPC ............ *G09F 3/208* (2013.01); *G08B 13/06* (2013.01); *G08B 13/2417* (2013.01);
(Continued)

(58) Field of Classification Search
CPC . G08B 13/2434; G08B 13/1445; G09F 3/208; E05B 73/0017; G09G 2380/04; B01D 2201/305
See application file for complete search history.

(56) References Cited

U.S. PATENT DOCUMENTS

2002/0084904 A1*  7/2002  De La Huerga ....... G16H 10/65
                                                    340/573.1
2003/0116632 A1   6/2003  Zimmerman et al.
(Continued)

FOREIGN PATENT DOCUMENTS

JP    2003-308504 A    10/2003
JP    2014-127102 A     7/2014
(Continued)

OTHER PUBLICATIONS

International Search Report, issued in PCT/FI2018/050164, dated Jun. 4, 2018.
(Continued)

*Primary Examiner* — Mirza F Alam
(74) *Attorney, Agent, or Firm* — Birch, Stewart, Kolasch & Birch, LLP

(57) ABSTRACT

An electronic price label system and electronic price label include a communicator configured to receive information relating to a product, a display for displaying information relating to a product, and a fastening ring for fastening the electronic price label to a product. The fastening ring is arranged to function as an antenna of the electronic price label, in which fastening ring a loop is formed.

19 Claims, 9 Drawing Sheets

(51) Int. Cl.
    *G08B 13/24*    (2006.01)
    *G09F 3/14*     (2006.01)
(52) U.S. Cl.
    CPC ..... *G08B 13/2434* (2013.01); *G08B 13/2474* (2013.01); *G09F 3/14* (2013.01)

(56) References Cited

U.S. PATENT DOCUMENTS

| | | | | |
|---|---|---|---|---|
| 2009/0026274 | A1* | 1/2009 | Gelbman | G06F 3/1454 |
| | | | | 235/492 |
| 2010/0141455 | A1* | 6/2010 | Stefanelli | G08B 13/1427 |
| | | | | 340/572.8 |
| 2014/0326791 | A1 | 11/2014 | Ishida et al. | |
| 2016/0004953 | A1 | 1/2016 | Karani et al. | |
| 2016/0183653 | A1* | 6/2016 | Warther | A45C 13/42 |
| | | | | 340/10.51 |
| 2021/0142142 | A1* | 5/2021 | Mak | G06K 19/07773 |

FOREIGN PATENT DOCUMENTS

| | | | |
|---|---|---|---|
| WO | WO 2009/006589 A1 | 1/2009 | |
| WO | WO 2009/103857 A1 | 8/2009 | |
| WO | WO 2016/116663 A1 | 7/2016 | |

OTHER PUBLICATIONS

Written Opinion of the International Searching Authority, issued in PCT/FI2018/050164, dated Jun. 4, 2018.

* cited by examiner

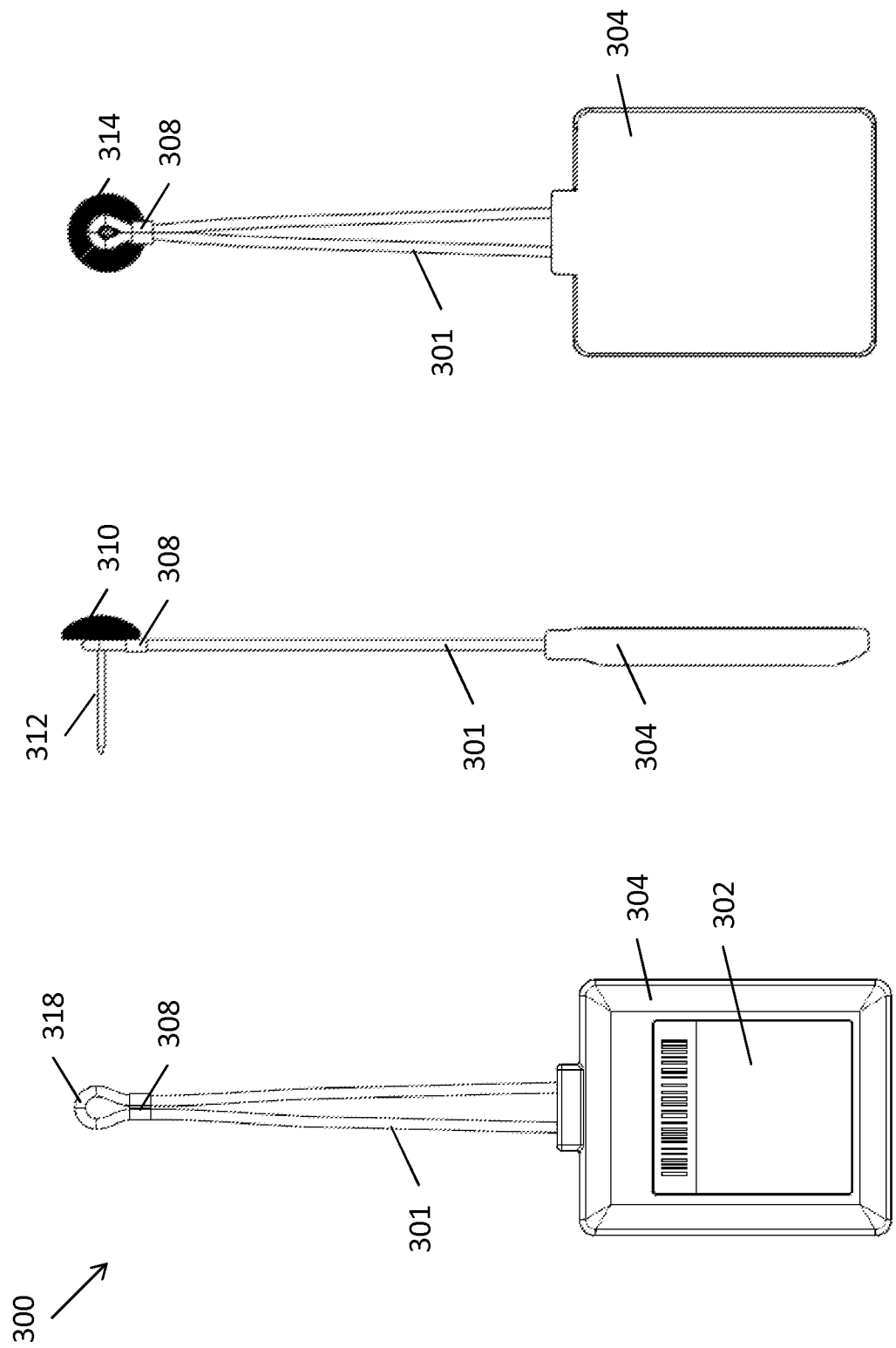

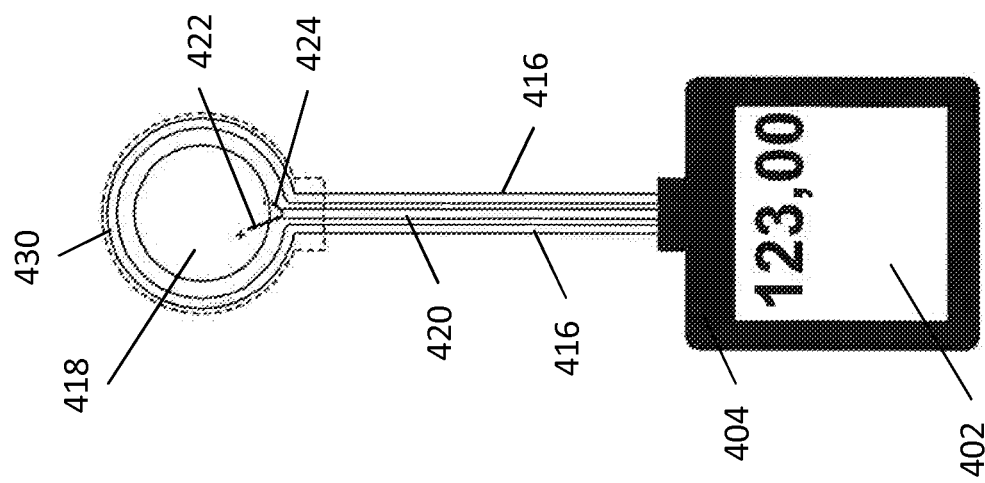
Fig. 4C
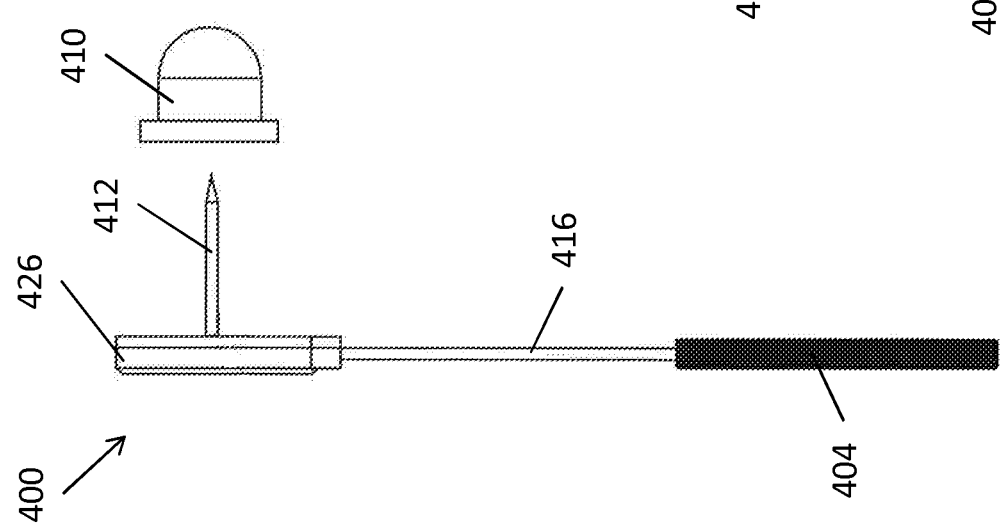
Fig. 4B
Fig. 4A

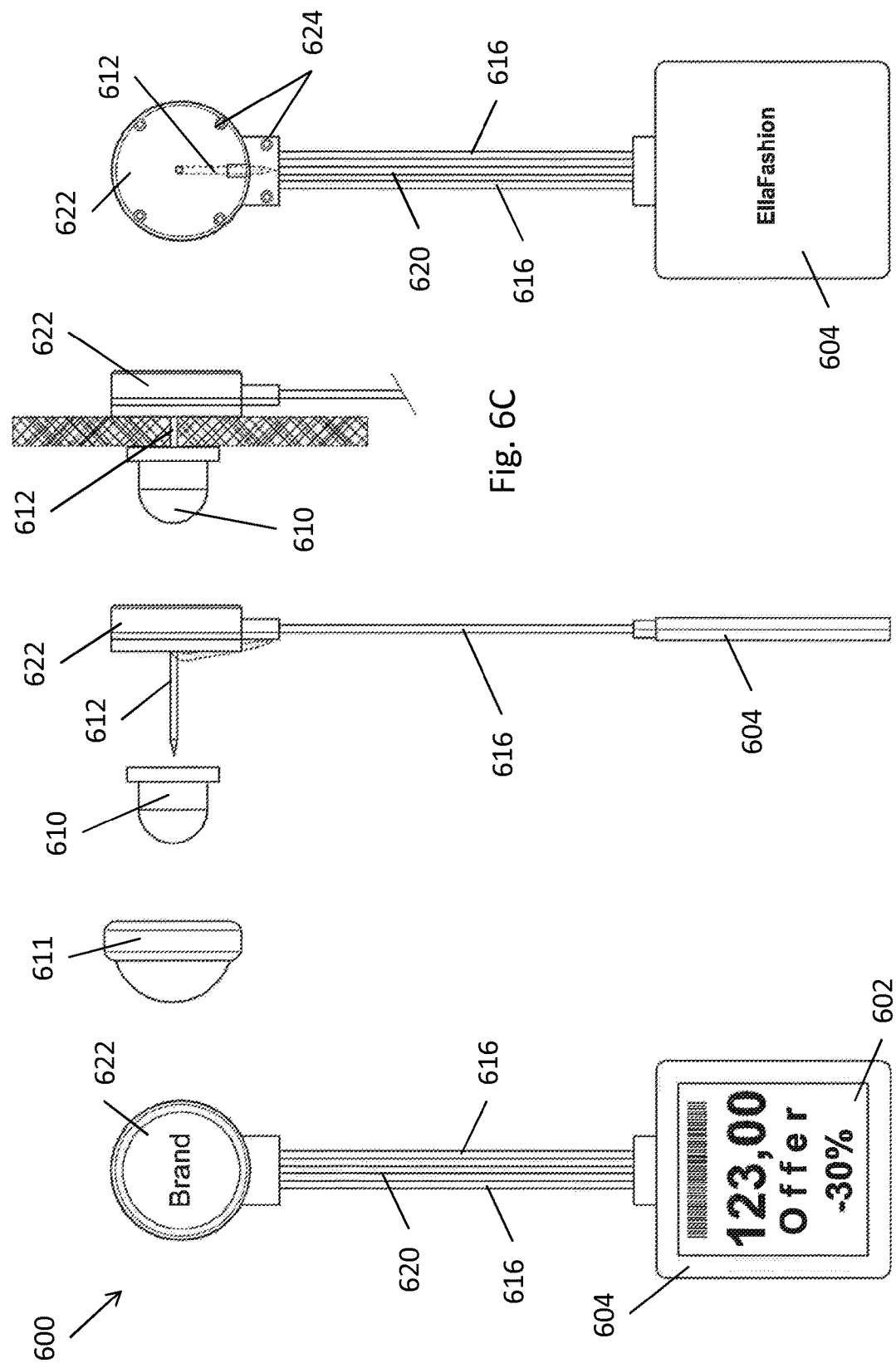

ELECTRONIC PRICE LABEL AND ELECTRONIC PRICE LABEL SYSTEM

FIELD OF THE INVENTION

The invention relates to an electronic price label and to an electronic price label system.

BACKGROUND OF THE INVENTION

Conventionally, the price information of price labels is changed manually when the price of a product changes. New price labels are printed onto paper or onto a corresponding material and these labels, with their new price markings, are manually disposed in locations reserved on products or on shelves in sales premises. Consequently, an employee must first find the correct location of the price label to be updated, and after this the previous price label is removed and discarded and the new price label is placed into its position. One drawback, among others, in this arrangement is that the arrangement is very laborious and the risk of errors is high. In the case of an error, e.g. a situation can arise in which the price information of a price label on the shelves is at variance with the price information of the checkout system.

In order to avoid the drawbacks described above, electronic systems have been developed wherein electronic labels are fastened onto the products or near the products, wherein the price information of the products can be changed centrally from the control center, or corresponding, of the system. This enables and significantly speeds up the updating of price information. The information on the displays can be updated in a wired or wireless manner, depending on the system.

Known from publication WO 2009/103857A1 is a system in which wireless electronic price labels are used. The properties of the wireless, layer-structured, electronic price labels presented in the publication are excellent. The communication of electronic price labels with the base stations of the electronic price label system is, however, challenging in the conditions typically prevailing in sales premises. This is caused by low available power, the small size of an electronic price label, and the low unit price required of an electronic price label.

SUMMARY OF THE INVENTION

The purpose of the invention is to enable an inexpensive and reliable electronic price label that is compact in size, that can communicate reliably with a base station of the electronic price label system also in difficult conditions, and that can easily be fastened to a product.

In the solution according to the invention, an electronic price label comprises communication means for receiving information relating to a product, a display for displaying information relating to a product, and a fastening ring for fastening the electronic price label to a product. In the solution according to the invention the fastening ring is arranged to function as an antenna of the electronic price label.

In the solution of the invention, a loop is formed in the fastening ring. In one embodiment of the invention, the first end of the fastening part, such as a tack, to be used in fastening the electronic price label is pushable through the loop, which loop is smaller than the second end of the fastening part. In one embodiment of the invention, a battery and/or a battery enclosure is/are arranged essentially in the center of the loop.

In one embodiment of the invention, the loop can be formed by means of a separate part, such as e.g. a ring or binding part. If e.g. a ring-shaped ring is used, the fastening ring can be threaded through it, in which case a loop having a diameter smaller than the fastening ring can be formed. In one embodiment of the invention, the loop formed by means of the ring is tightenable. In one embodiment of the invention, the ring is fixedly fastened in place. An open ring or binding part can also be placed around the fastening ring and pressed closed at the desired point, in which case a loop forms on the other side of the ring or binding part. In one embodiment of the invention, a loop can be formed by fastening the parts of the fastening ring to each other, e.g. by gluing or in the manufacturing phase of the fastening ring, in such a way that the loop is formed to be of the desired shape and/or size. In such a case a separate ring or binding part is not necessarily needed in the solution.

In one embodiment of the invention, the fastening ring is a ring and/or cord comprising metal, e.g. a metal loop or metal cord coated with plastic.

In one embodiment of the invention, the fastening ring functioning as an antenna is the antenna of the electronic price label system, by means of which antenna the electronic price label is adapted to send and receive to/from a base station of the electronic price label system.

In one embodiment of the invention, the electronic price label further comprises an RFID antenna. The RFID antenna can be a separate antenna to the antenna of the electronic price label system. In another embodiment, the fastening ring can be adapted to function as both an antenna of the electronic price label system and as an RFID antenna.

In one embodiment of the invention, the fastening ring comprises two separate parts functioning as radiator parts of the antenna. The first part functioning as a radiator part of an antenna of the fastening ring can be adapted to function as an antenna of the electronic price label system, and the second part functioning as a radiator part of an antenna of the fastening ring can be adapted to function as an RFID antenna.

The solution according to the invention has a number of important advantages when it is compared to solutions known in the art. By means of the solution according to the invention, the size of the antenna can be arranged to be larger than in solutions known in the art, in which the antenna of an electronic price label is situated inside the frame part of the price label. Via this solution, the performance of the antenna improves compared to an internal antenna. The selections made regarding the material, structure and cross-section of an antenna, such as e.g. a cable can also optimize the antenna. By means of the solution according to the invention, also the placement of other antennas (e.g. theft alarm antenna, RFID antenna) in the frame part of the price label is easier because the antennas do not interfere with each other. The loop to be used in the solution of the invention can be utilized in many different ways. In one embodiment, for example, the fastening of an electronic price label to a product succeeds easily e.g. by means of a separate fastening part, such as a tack, which tack is pushed through a loop formed in the fastening ring.

DESCRIPTION OF THE FIGURES

In the following, the invention will be described in more detail by the aid of some examples of its embodiment with reference to the attached drawings, wherein FIG. 3A presents a front view of an electronic price label according to an embodiment of the invention and of its fastening ring, FIG. 3B presents a side view of an electronic price label according to an embodiment of the invention and of its fastening ring, FIG. 3C presents a rear view of an electronic price label according to an embodiment of the invention and of its fastening ring, FIG. 4A presents a side view of an electronic price label according to an embodiment of the invention and of its fastening ring, FIG. 4B presents a front view of an electronic price label according to an embodiment of the invention and of its fastening ring, FIG. 4C presents a cross-section of an electronic price label according to an embodiment of the invention and of its battery enclosure, FIG. 6A presents a front view of an electronic price label according to an embodiment of the invention and of its fastening ring, FIG. 6B presents a side view of an electronic price label according to an embodiment of the invention and of its fastening ring, FIG. 6C presents an electronic price label according to an embodiment of the invention and the fastening of its fastening ring to a product, FIG. 6D presents a rear view of an electronic price label according to an embodiment of the invention and of its fastening ring.

DETAILED DESCRIPTION OF THE INVENTION

In the solution according to the invention, an electronic price label comprises communication means for receiving information relating to a product, a display for displaying information relating to a product, and a fastening ring for fastening the electronic price label to a product, which fastening ring is arranged to function as an antenna of the electronic price label.

Figure 1B:
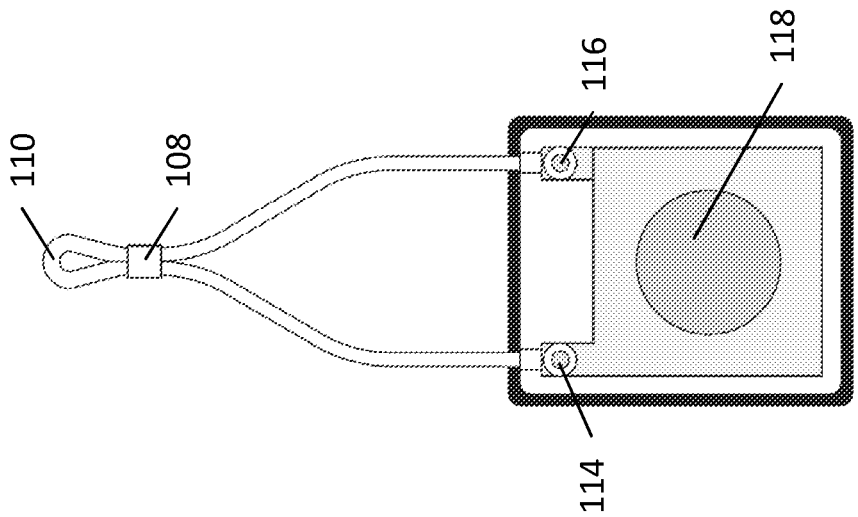
FIG. 1B presents a cross-section of an electronic price label according to an embodiment of the invention and of its fastening ring.
Figure 1A:
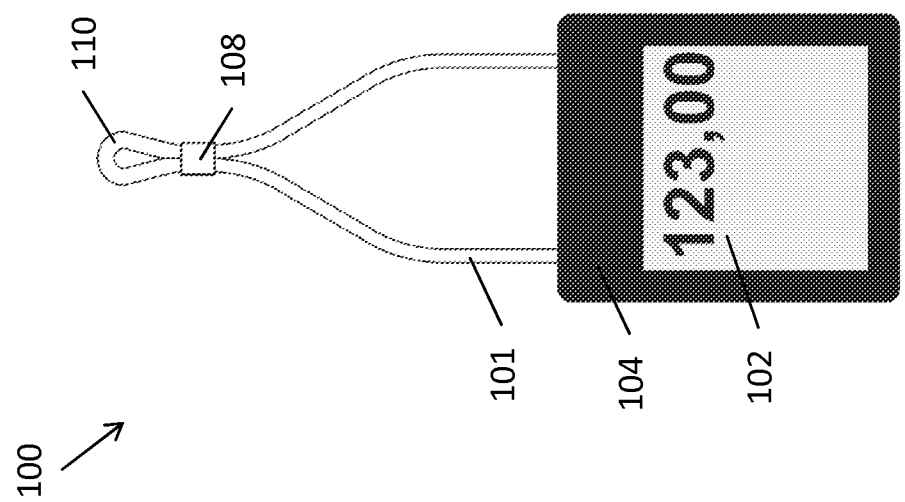
FIG. 1A presents a front view of an electronic price label according to an embodiment of the invention and of its fastening ring.

FIGS. 1A and 1B present a diagrammatic and simplified view of an electronic price label 100 according to the invention. The electronic price label 100 to be used in the solution of the invention comprises a display 102, such as e.g. a laminate display, which is arranged to display the price information and/or product information of a product. Also other information relating to a product, such as e.g. the name of the product, can be presented on the front surface of an electronic price label. The frame part 104 of an electronic price label can, in terms of its material and structure, be hard or, alternatively, elastic and flexible. The electronics of the electronic price label can be disposed inside the frame part 104 or in connection with it. The display 102 of the electronic price label can be provided with display segments or pixels. The electronic price label 100 resembles a price label of paper, on which price label the required prices of products and other necessary symbols are formed by changing the colors of the segments or pixels of the display 102. The display 102 can be dichromatic or polychromatic.

In one embodiment of the invention, one layer of the display 102 is e.g. an active ink layer. The ink layer contains a number of microcapsules, which are filled with a liquid and which contain e.g. essentially black particles, which have a positive surface charge and the location of which is controlled with an electrical field in such a way that in the desired display segments the black particles are on, wherein the aforementioned display segment appears black when it is viewed from above, and in the other display segments the white particles are on, wherein these display segments appear white when viewed from above. The background of the display 102 is formed from the same microcapsules, wherein e.g. price information can be displayed as dark numbers against a light background or, if so desired, vice versa. This type of display, which is used, can be an electrophoretic microcapsule display laminate as described e.g. in Finnish patent application FI 20050192. In one embodiment of the invention, the surface of the electronic price label is essentially flat.

The electronic price label according to the invention comprises communication means, with which it can communicate with the electronic price label system and its base stations. With the aid of the communication means, the electronic price labels can listen for a transmission sent by the electronic price label system and identify a command intended for themselves on the basis of an identifier specific to a certain price label. After receiving a command addressed to itself, an individual electronic price label can respond to the base station by reflecting the base station's own transmission back to the base station modified by the amount of the phase shift caused by a certain time delay and at a certain moment in time. Typically, after sending a command intended for a certain price label, a base station of the electronic price label system starts to send for a certain time e.g. a certain type of carrier wave, which the price label that identified the command reflects back with a certain phase shift. A base station of the electronic price label system is thus able in this embodiment to identify a reflection response as belonging to a certain price label because it is able to wait for a certain period of time after the individualized command it sends to the price label in question. The base station can distinguish from its own transmission the reflection response of considerably weaker power than the transmission, e.g. based on the phase shift produced in it by the display device.

The electronic price label to be used in the solution of the invention can comprise communication means, in which are state-changing means for changing the state of the antenna of the receiver between at least two states, in which e.g. in the first state the reflectivity of the antenna is good and in the second state the reflectivity is poor. Correspondingly, the antenna states can be adapted with the state-changing means in such a way that in different states the antenna reflects radio waves in different phases. In this case, therefore, the electronic price label can be adapted to change the state of the antenna of its receiver in order to produce a coded reflection in a certain manner with a different time delay according to the state of the antenna. The base stations of the electronic price label system can interpret different time delays sent by electronic price labels as coded data signals, based on which e.g. the base stations can identify each display unit. The aforementioned coding can, at its simplest, be such that an electronic price label can reflect back a carrier wave transmitted by a base station, which wave can be of a frequency of e.g. 685 MHz, in such a way that the electronic price label earths, by means of the state-changing means, the antenna of the receiver e.g. at a frequency of 150 kHz, thus forming a certain kind of square wave from the reflected signal. The electronic price label can thus affect the reflected signal by changing the state of the antenna. In this reflection the phase shift undergone by the signal can be e.g. 180 degrees. The communication method described in the preceding is presented as only an example and the communication between an electronic price label according to the invention and a base station of the electronic price label system can be arranged in another manner known in the art.

In the solution of the invention, the electronic price label comprises a fastening ring, by means of which the electronic price label can be fastened to a product. The fastening ring is arranged to function as an antenna. In the solution according to the invention, the fastening ring functioning as an antenna, with which the electronic price label can be fastened to a product, can in one embodiment be a fastening ring separate from the electronic price label. In this case the fastening ring is detachable from the electronic price label without tools. In another embodiment of the invention, the fastening ring is arranged on the electronic price label or is fixedly in connection with it. The fastening ring functioning as an antenna comprises a type of material, such as e.g. metal, by means of which at least one radiator part of the antenna is formed in the fastening ring, which radiator part is arranged in such a way that it connects electrically to the electronic price label and to its communication means. In the solution of the invention, the fastening ring is adapted to function as an antenna of the electronic price label system and/or as an RFID antenna.

FIGS. 1A and 1B present a solution according to one embodiment of the invention, the solution comprising a one-piece fastening ring. In the case of the embodiment presented in FIGS. 1A and 1B, the fastening ring 101 is fastened electrically to the electronic price label via contact points 114, 116 inside the frame part 104 of the electronic price label. In the embodiments of FIGS. 1A and 1B, a ring-shaped ring 108 is used, through which the fastening ring 101 can be threaded in the manner presented in the figure. In such a case a loop 110 can be formed in the fastening ring 101, by means of which loop the electronic price label 100 can be fastened to a product. In one embodiment of the invention, the loop formed by means of the ring is tightenable. In one embodiment of the invention, the ring is fixedly fastened in place. The electronic price label can comprise a battery 118.

Figure 2B:
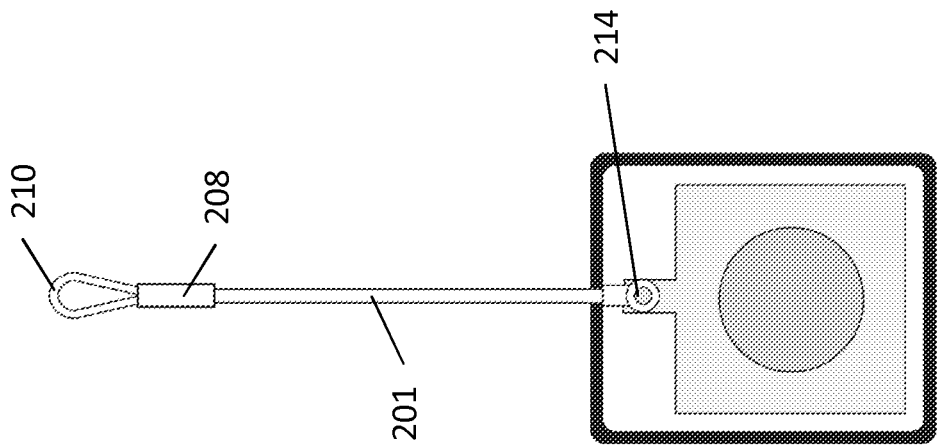
FIG. 2B presents a cross-section of an electronic price label according to an embodiment of the invention and of its fastening ring.
Figure 2A:
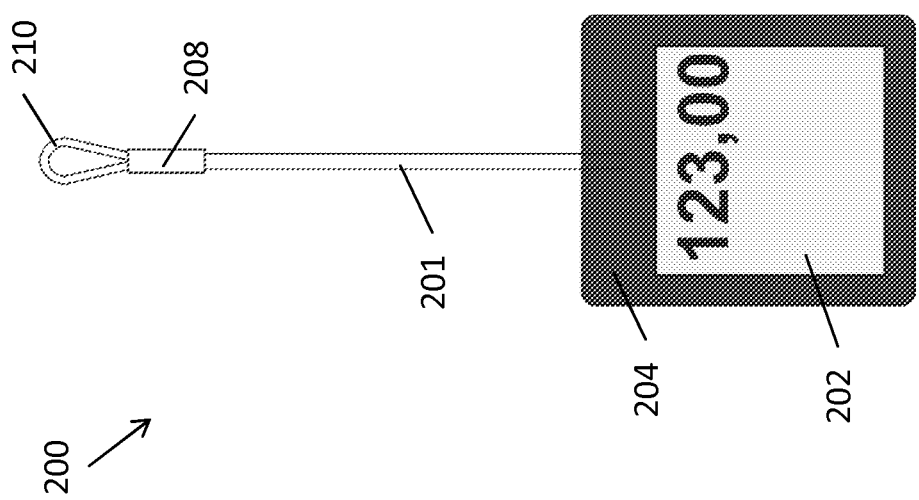
FIG. 2A presents a front view of an electronic price label according to an embodiment of the invention and of its fastening ring.
Figure 3D:
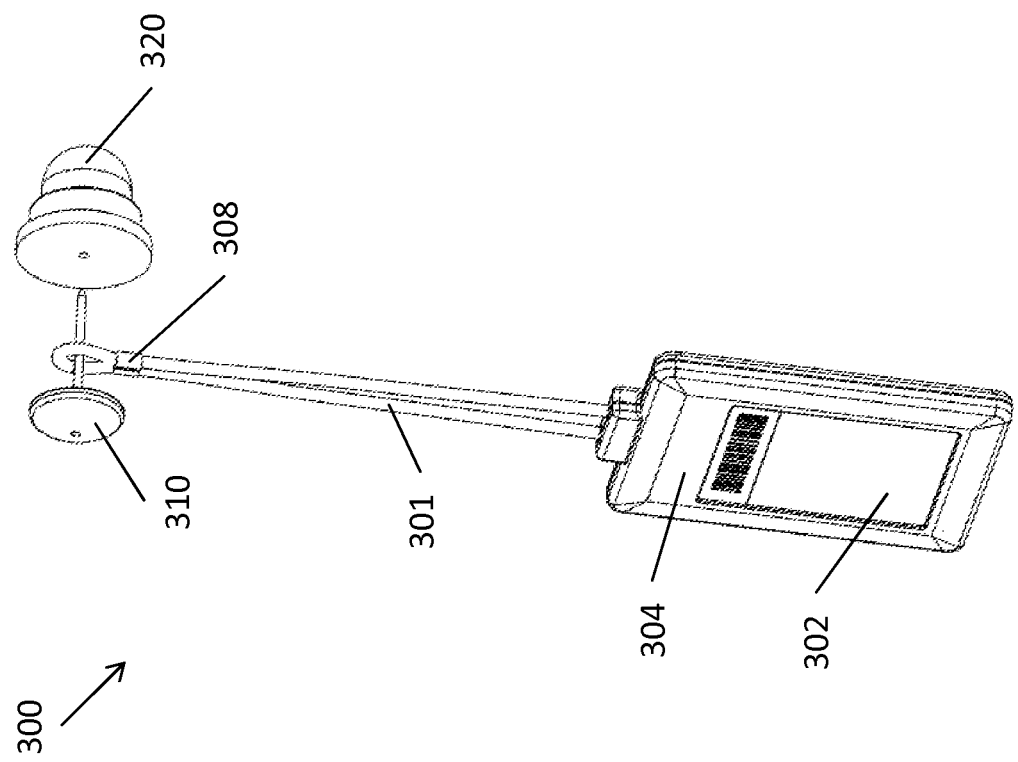
FIG. 3D presents an oblique front view of an electronic price label according to an embodiment of the invention and of its fastening ring.

FIGS. 2A and 2B present a solution according to one embodiment of the invention, the solution comprising a one-piece fastening ring 201. The embodiment presented in FIGS. 2A-2B otherwise corresponds to the electronic price label presented in FIGS. 1B and 1A but the fastening ring 201 is formed from one cord-like and electrically conducting part, which is fastened electrically to the electronic price label, to one contact point 214 inside the frame part 204 of the electronic price label. A loop 210 is formed in the end of the fastening ring 201 by means of a binding part 208.

The fastening ring to be used in the solution of the invention can be a cord-like part, essentially round in cross-sectional shape and comprising metal that is coated with a plastic layer.

The fastening ring has, in at least a part of the fastening ring, a contact area via which an electrical connection can be formed between the communication means of the electronic price label and the fastening ring functioning as an antenna.

In one embodiment of the invention, the fastening ring can comprise at least one loop-shaped or ring-shaped part, through which can be pushed e.g. a fastening part, such as a tack, for fastening the price label to a product.

FIGS. 3A-3D present an example of one embodiment of the invention. The electronic price label of FIGS. 3A-3D otherwise corresponds to the electronic price labels of earlier figures, but the fastening ring 301 is arranged in a different manner than in the embodiments of the earlier figures. The price label of the figures in question, FIGS. 3A-3D, comprises a frame part 304 and a fastening ring 301 fastened to it. A loop 318 is formed in the fastening ring by means of a ring-shaped link 308. The first end 312 of the fastening part 310 to be used in fastening the electronic price label is pushable through the loop. The loop is smaller than the second end 314 of the fastening part 310, in which case the electronic price label can be fastened to a product when the fastening part is pushed first through the loop, and after this through the product or an aperture in the product into a separate locking part 320. The electronic price label also comprises a display 302.

The fastening part, such as a tack, is pushable through the ring-shaped part and after this into a separate locking part, in which case the electronic price label can be fastened to a product.

FIGS. 4A-4C present an embodiment in which the electronic price label comprises a battery 418, which is disposed separately from the frame part of the electronic price label. In the embodiment presented in FIGS. 4A-4C, the fastening ring 416 functions as an antenna of the electronic price label and forms a loop, which essentially surrounds the battery 418 and/or battery enclosure 426 arranged inside and in the center of the loop 430. A loop can be formed e.g. in the battery enclosure by means of a space formed for the fastening ring. The space for the fastening ring can circle, e.g. in connection with the outer edge of the battery enclosure, essentially around the battery enclosure. The conductors 422, 424 of the battery are separate conductors to the fastening ring 416 functioning as an antenna. The conductors of the battery can be arranged to travel in connection with each other, e.g. in one cable 420. In other respects, the electronic price label presented in FIGS. 4A-4C corresponds to the embodiments presented in the previous figures, and comprises a display 402 and a frame part 404 of the electronic price label. In one embodiment of the invention, a fastening part 412, such as a spike, can be arranged in connection with the battery and/or battery enclosure, in which case the electronic price label can be fastened to a product when the fastening part 412 is pushed first through a product or an aperture in a product into a separate locking part 410.

Figure 5A:
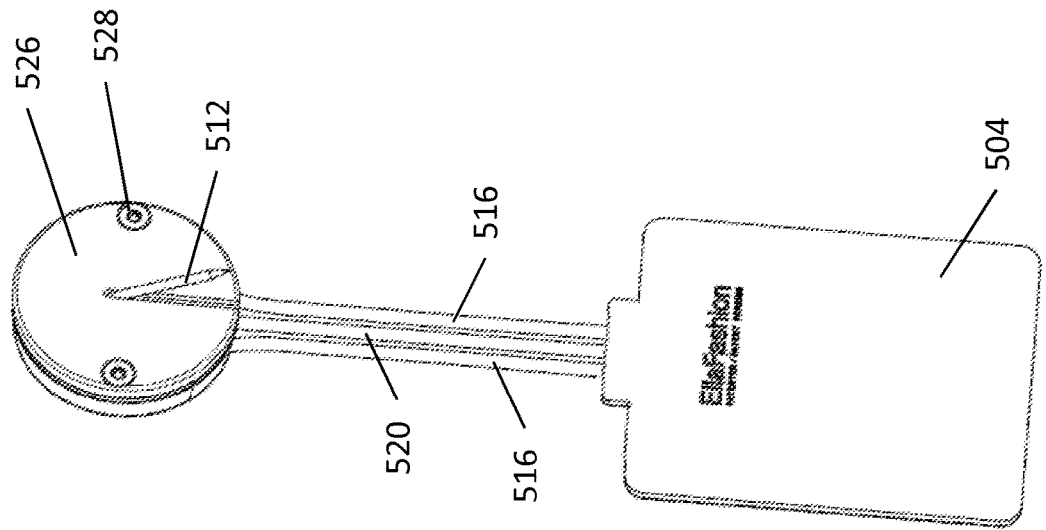
FIG. 5A presents an oblique front view of an electronic price label according to an embodiment of the invention and of its fastening ring.
Figure 5B:
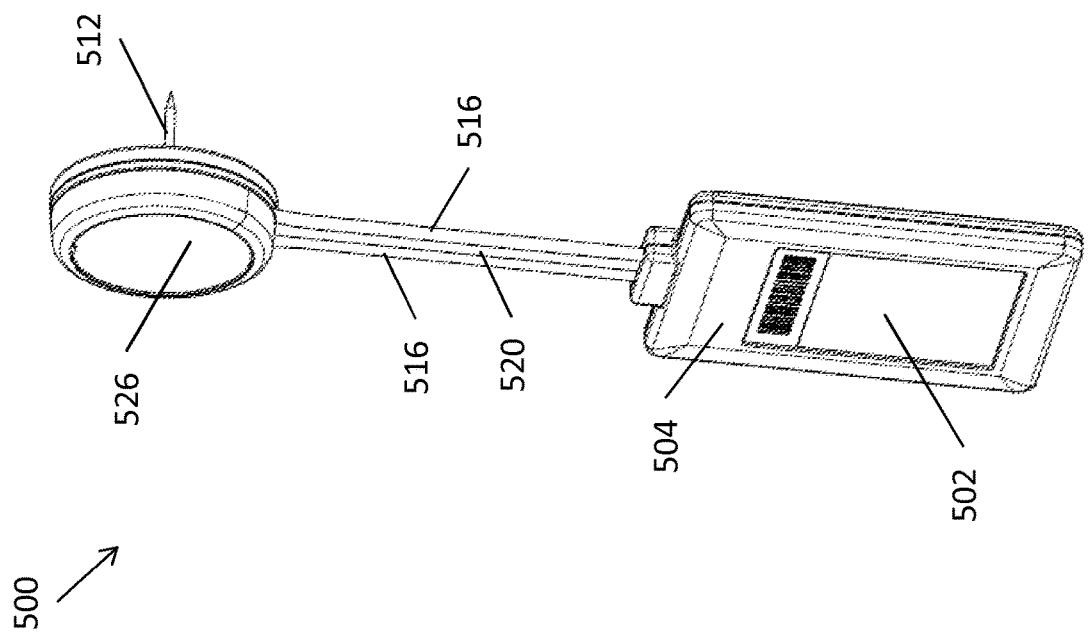
FIG. 5B presents an oblique rear view of an electronic price label according to an embodiment of the invention and of its fastening ring.

The embodiment presented in FIGS. 5A and 5B corresponds to the embodiment presented in FIGS. 4A-4C but the fastening part 512, such as a spike, arranged in connection with the battery and/or battery enclosure and with which fastening part the electronic price label can be fastened to a product, is arranged to be pivotable. The pivotable fastening part 512 can be turned essentially against the battery enclosure, in which case it facilitates e.g. storage of the electronic price label when the price label is not in use. The pivotable fastening part can be turned, when fastening it to a product, to be essentially at a right angle to the battery enclosure of an electronic price label, as in FIG. 5A, in which case it can be fastened through a product into a separate locking part. In one embodiment of the invention, there can be a recess in the battery enclosure for the turned fastening part. The battery enclosure can be formed from a number of parts, e.g. a rear cover and a front cover. These can be fastened to each other e.g. with screws 528.

Also the embodiment of FIGS. 5A-5B, like the embodiment of FIGS. 4A-C, comprises a battery that is disposed separately from the frame part of the electronic price label. In the embodiment presented in FIGS. 5A-B, the fastening ring 516 functions as an antenna of the electronic price label and forms a loop, which essentially surrounds the battery and/or battery enclosure 526 arranged inside and in the center of the loop. The conductors of the battery are separate conductors to the fastening ring 516 functioning as an antenna. The conductors of the battery can be arranged to travel in connection with each other, e.g. in one cable 520. In other respects, the electronic price label presented in FIGS. 5A-5B corresponds to the embodiments presented in the previous figures, and comprises a display 502 and a frame part 504 of the electronic price label.

The embodiment presented in FIGS. 6A-6D corresponds otherwise to the embodiment of FIGS. 4A-4C but the battery enclosure is arranged in a different way in this embodiment. In the embodiment presented in FIGS. 6A-6D, the fastening ring 616 functions as an antenna of the electronic price label and forms a loop, which essentially surrounds the battery and/or battery enclosure 622 arranged inside and in the center of the loop. The conductors of the battery are separate conductors to the fastening ring 616 functioning as an antenna. The conductors of the battery can be arranged to travel in connection with each other, e.g. in one cable 620. The electronic price label comprises a display 602 and a frame part 604 of the electronic price label.

In the embodiment presented in FIGS. 6A-6D a pivoted fastening part 612, such as a spike, is arranged in connection with the battery and/or battery enclosure, in which case the electronic price label can be fastened to a product when the fastening part 612 is pushed through the product into a separate locking part 610. The pivotable fastening part can be turned essentially against the battery enclosure, in which case it facilitates e.g. storage of the electronic price label when the price label is not in use (presented with a dashed line). The pivotable fastening part can be turned, when fastening, to be essentially at a right angle to the battery enclosure of an electronic price label, as in FIG. 6B, in which case it can be fastened through a product into a separate locking part 610. Instead of a plain locking part 612, also a locking part 611 comprising an antitheft part can also be used in the solution of the invention. The battery enclosure 622 can be arranged to be openable, in which case replacement of the battery is easy to perform. The battery enclosure can comprise separate parts, e.g. a rear part and a front part, which can be fastened to each other e.g. with screws 624.

Figure 7B:
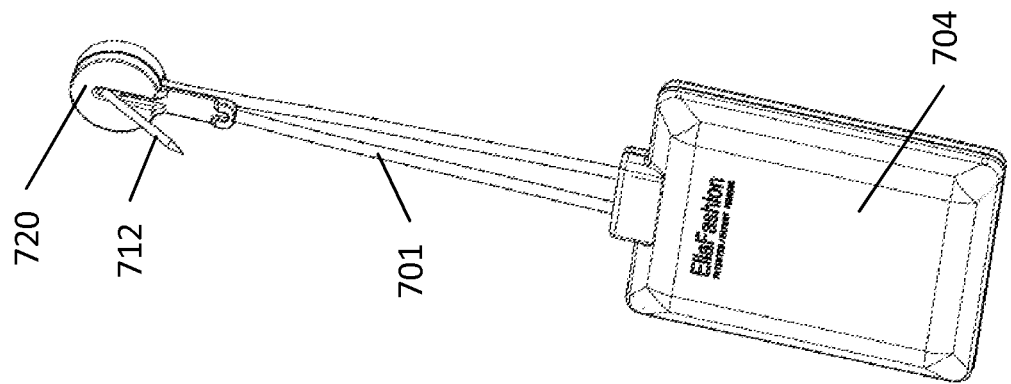
FIG. 7B presents an oblique rear view of an electronic price label according to an embodiment of the invention and of its fastening ring.
Figure 7A:
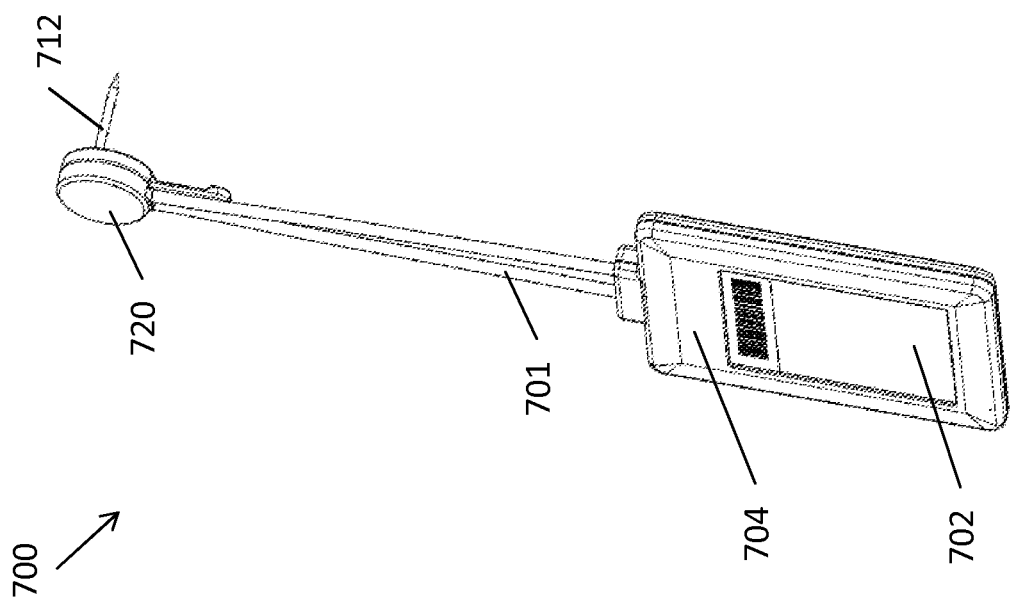
FIG. 7A presents an oblique front view of an electronic price label according to an embodiment of the invention and of its fastening ring.

The embodiment presented in FIGS. 7A-7B otherwise corresponds to the embodiment presented in FIGS. 3A-3D but in this solution means are arranged in connection with the loop formed in the fastening ring 701 for fastening the fastening part 712, such as a spike. The fastening part 712 can be fastened e.g. onto the enclosure 720 of the fastening part, which enclosure is arranged in connection with the loop formed in the fastening ring 701. The price label of FIGS. 7A-7B, like the embodiment presented in FIGS. 3A-3D, comprises a frame part 704, a display 702 and a fastening ring 701 fastened to the frame part 704. The fastening part 712 can be arranged to be foldable, such as in the case of the embodiments described above. In one embodiment of the invention, there can be a recess in the enclosure 720 for the turned fastening part 712.

Figure 8:
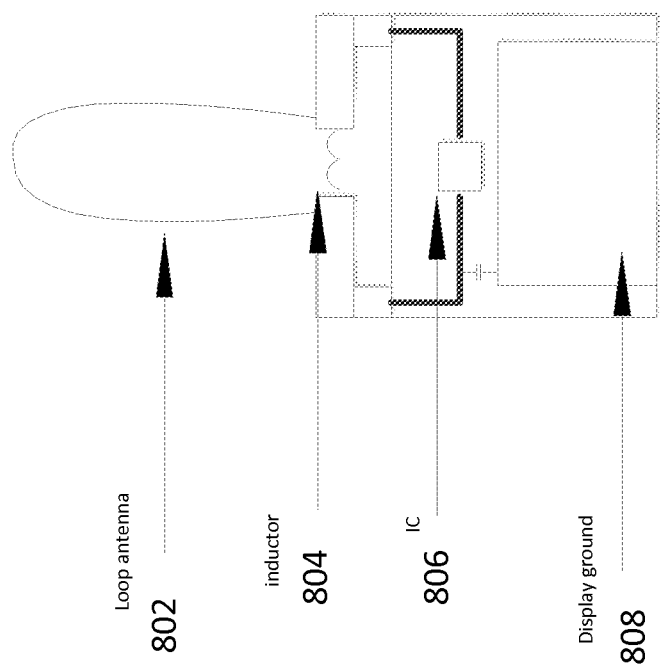
FIG. 8 presents a schematic view of the electrical structure of an electronic price label according to an embodiment of the invention.

FIG. 8 presents a schematic view of the electrical structure of an electronic price label according to an embodiment of the invention. In the case of this embodiment, the ground plane 808 of the display of the electronic price label is connected capacitively to the antenna. The antenna is also circuit board electrically connected to a circuit board 806. In one embodiment of the invention, the fastening ring 802 functioning as an antenna of the electronic price label can be divided into two loops with inductance 804. In this way, in the right conditions the antenna can be made to be as broadband as possible. The aforementioned electrical solutions can be utilized in the different embodiments of the invention described in this application.

In one embodiment of the invention, the fastening arrangement functioning as an antenna comprises one cord-type fastening ring, which is fixedly arranged in connection with the frame part. The fastening ring can also be arranged in connection with the frame part in such a way that it can be detached and refastened easily, e.g. without tools. The fastening ring can be arranged to pass around the electronic price label in connection with the edge of the frame part of the electronic price label. The fastening ring can be connected electrically from at least one point to the electronic price label and to its communication means.

In one embodiment of the invention, the fastening ring comprises two separate parts functioning as radiator parts of the antenna, which parts can be arranged in connection with the frame part. The radiator parts can be connected electrically to the communication means of the electronic price label via contact points.

In one embodiment of the invention, on the surface of the fastening ring can be an electrically non-conducting material, e.g. plastic, in which case the fastening ring or fastening rings functioning as an antenna is/are insulated electrically from each other when they are touching each other.

An antenna comprising two separate radiator parts can function in such a way that both the antennas send or receive the same transmission as each other, i.e. for example information relating to the electronic price label system and/or a transmission according to the RFID standard. It is also possible to arrange the antennas and an electronic price label in such a way that one antenna sends and receives the information of the electronic price label system (i.e. it is an antenna of the electronic price label system) and the other antenna is an RFID antenna.

In one embodiment of the invention, the fastening ring functioning as an antenna is the antenna of the electronic price label system and the electronic price label further comprises a separate RFID antenna, which is arranged in connection with the frame part of the electronic price label and/or inside the frame part.

In one embodiment of the invention, the fastening ring functioning as an antenna can be an antenna for downlink traffic, i.e. an antenna to be used in receiving a transmission arriving at the electronic price label from the base station of the electronic price label. The antenna for uplink traffic can, in this embodiment, be an antenna that is separate and is inside the electronic price label, e.g. a loop antenna inside the frame part. If an electronic price label has two separate antennas functioning as a fastening ring, one of the antennas can be an uplink antenna and the other a downlink antenna.

In one embodiment of the invention, the electronic price label comprises antitheft properties.

The invention also relates to an electronic price label system, which comprises a plurality of electronic price labels and at least one base station that is adapted to send and receive information to/from any electronic price label whatsoever. In one embodiment of the invention, the electronic price label system is adapted to issue an alarm signal. The system can e.g. issue an alarm signal in a situation in which a base station cannot communicate with an electronic price label and/or if the fastening ring of an electronic price label is cut.

In one embodiment of the invention, the electronic price label system can further comprise security gates, and an alarm signal is based on a response of the security gates when an electronic price label is taken though a security gate.

In one embodiment of the invention, the frame part, front surface and/or rear surface of the electronic price label and/or the fastening ring are essentially flexible. In one embodiment of the invention, the frame part, front surface and/or rear surface of the price label and/or the protective element are essentially hard and inflexible.

In the solution according to the invention the fastening ring can be arranged e.g. into an open ring or into a closed ring. The fastening ring can also be a cord-like means, which is fastened at one end to an electronic price label and in the second end of which cord-like means a loop is formed.

In one embodiment of the invention, the loop can be formed by means of a separate part, such as e.g. a ring or binding part. If e.g. a ring-shaped ring is used, the fastening ring can be threaded through it, in which case a loop having a diameter smaller than the fastening ring can be formed. In one embodiment of the invention, the loop formed by means of the ring is tightenable. In one embodiment of the invention, the ring is fixedly fastened in place. Also e.g. an open ring or binding part can be placed around the fastening ring, and the ring or part can be pressed closed at the desired point in such a way that a loop forms on the other side of the ring or binding part. In one embodiment of the invention, a loop can be formed by fastening the parts of the fastening ring to each other, e.g. by gluing or in the manufacturing phase of the fastening ring, in such a way that the loop is formed to be of the desired shape and/or size. In such a case a separate ring or binding part is not necessarily needed in the solution. All the aforementioned methods for forming a loop can be used in the different embodiments of the invention presented in this application even though only one example embodiment relating to a certain embodiment, such as using a ring-shaped ring, is presented in the figures and the description.

It is obvious to the person skilled in the art that the invention is not limited to the embodiments presented above, but that it can be varied within the scope of the claims presented below. The characteristic features presented in the description mentioned in conjunction with each other can also be independent characteristic features.

The invention claimed is:

1. An electronic price label, which comprises:
   a communicator configured to receive information relating to a product;
   a frame part;
   a display for displaying information relating to a product; and
   a fastening ring for fastening the electronic price label to a product,
   wherein the fastening ring is arranged to function as an antenna of the electronic price label, and the electronic price label is configured to send to and receive from a base station of the electronic price label system via said antenna,
   wherein a loop is formed in the fastening ring, and
   wherein the electronic price label further comprises an RFID antenna, which is a separate antenna to said antenna of the electronic price label system, and the RFID antenna is arranged in connection with the frame part of the electronic price label and/or inside the frame part.

2. The electronic price label according to claim 1, wherein a first end of a fastening part to be used in fastening the electronic price label is pushable through the loop, and the loop is smaller than a second end of the fastening part.

3. The electronic price label according to claim 1, wherein a battery and/or a battery enclosure is arranged essentially in a center of the loop.

4. The electronic price label according to claim 3, wherein conductors of the battery are arranged to travel in connection with the fastening ring.

5. The electronic price label according to claim 4, wherein the conductors of the battery are separate conductors to the fastening ring functioning as an antenna.

6. The electronic price label according to claim 1, wherein a loop is formed essentially at an end of the fastening ring or essentially midway in the fastening ring.

7. The electronic price label according to claim 2, wherein the fastening part to be used in fastening the electronic price label is a spike-type fastening part.

8. The electronic price label according to claim 1, wherein a ground plane of the display is connected capacitively to the fastening ring functioning as an antenna.

9. The electronic price label according to claim 1, wherein the fastening ring is divided electrically into two parts with inductance.

10. The electronic price label according to claim 1, wherein the fastening ring is a steel wire cable and/or a ring and/or cord comprising metal.

11. The electronic price label according to claim 1, wherein the fastening ring is a metal loop or metal cord coated with plastic.

12. The electronic price label according to claim 1, wherein the fastening ring comprises at least one part functioning as a radiator part of the antenna.

13. The electronic price label according to claim 1, wherein the fastening ring is adapted to function as both an antenna of the electronic price label system and as an RFID antenna.

14. The electronic price label according to claim 1, wherein the communicator communicates with a base station of the electronic price label system by reflecting back signals received thereby.

15. The electronic price label according to claim 1, further comprising antitheft properties.

16. An electronic price label system, wherein the system comprises:
- a plurality of electronic price labels according to claim 1; and
- at least one base station that is adapted to send and receive information to/from any of the plurality of electronic price labels.

17. The electronic price label system according to claim 16, wherein the system is adapted to issue an alarm signal.

18. The electronic price label system according to claim 17, wherein the system is adapted to issue an alarm signal to the electronic price label, if the base station cannot communicate with the electronic price label and/or if the fastening ring of the electronic price label is cut.

19. The electronic price label system according to claim 17, wherein the electronic price label system further comprises security gates, and the alarm signal is based on a response of the security gates when an electronic price label is taken though a security gate.

* * * * *